United States Patent
Friman

(10) Patent No.: US 8,452,267 B2
(45) Date of Patent: May 28, 2013

(54) SYSTEM AND METHOD FOR GRANTING ACCESS TO A SYSTEM

(75) Inventor: Kai-Erik Friman, Espoo (FI)

(73) Assignee: EazyBreak Oy, Helsinki (FI)

( * ) Notice: Subject to any disclaimer, the term of this patent is extended or adjusted under 35 U.S.C. 154(b) by 189 days.

(21) Appl. No.: 12/953,610

(22) Filed: Nov. 24, 2010

(65) Prior Publication Data
US 2011/0130126 A1    Jun. 2, 2011

(30) Foreign Application Priority Data

Nov. 27, 2009   (FI) ..................................... 20090448
Nov. 27, 2009   (FI) ..................................... 20090449

(51) Int. Cl.
*H04M 3/42*    (2006.01)

(52) U.S. Cl.
USPC ..... 455/414.1; 455/420; 455/408; 455/432.3; 455/558; 455/466; 705/75; 705/34; 705/38; 705/26; 705/40

(58) Field of Classification Search
USPC ............... 455/414.1, 420, 408, 432.1, 558, 455/466; 705/26, 34, 38, 40, 75
See application file for complete search history.

(56) References Cited

U.S. PATENT DOCUMENTS

| | | | |
|---|---|---|---|
| 6,868,391 B1* | 3/2005 | Hultgren | 705/17 |
| 7,600,676 B1 | 10/2009 | Rados | |
| 7,831,246 B1* | 11/2010 | Smith et al. | 455/420 |
| 2003/0200184 A1 | 10/2003 | Dominguez | |
| 2009/0018924 A1 | 1/2009 | Roberts | |
| 2009/0171805 A1 | 7/2009 | Gould | |
| 2009/0254440 A1 | 10/2009 | Pharris | |
| 2011/0022515 A1* | 1/2011 | Tallitsch et al. | 705/40 |

FOREIGN PATENT DOCUMENTS

| | | |
|---|---|---|
| EP | 1569152 A2 | 8/2005 |
| KR | 20080103972 | 11/2008 |
| WO | 0173709 A2 | 10/2001 |

\* cited by examiner

*Primary Examiner* — Kiet Doan
*Assistant Examiner* — Michael T. Vu
(74) *Attorney, Agent, or Firm* — Ziegler IP Law Group, LLC

(57) ABSTRACT

A method and system for granting access to a service is based on a received request and a communication between a subscriber, client and a service provider.

17 Claims, 5 Drawing Sheets

SYSTEM AND METHOD FOR GRANTING ACCESS TO A SYSTEM

BACKGROUND

1. Field

The aspects of the disclosed embodiments generally relate to granting access to a system, and are particularly, but not exclusively, suited to a system enabling mobile payment of a service.

2. Brief Description of Related Developments

There are multiple ways to pay for goods and services. Credit cards, debit cards etc are widely used way to pay instead of cash. In addition to general type of payment methods, there exists payment methods which are based on vouchers, gift cards etc issued as a return for prepayment by a merchant himself or by another entity. Many merchants accept also so called value notes (such as Lounasseteli™ in Finland), gift cards, present cards, vouchers.

One example of such prepaid system is lunch voucher (such as Lounasseteli™ in Finland) where an employer pays before hand for given number of lunch vouchers to issuer of vouchers. Said vouchers are then given either as bonus, fringe benefit or as part of salary to employees. Employees can use the vouchers to pay for lunch or dinner in restaurant by giving the voucher as payment to merchant. Merchants then send vouchers later to issuer of the vouchers and receive money.

A particular problem experienced with such system with vouchers is the amount of manual work needed in handling distribution of vouchers from voucher issuer to an employee via an employer and then back from an employer to the issuer via a merchant. Additional problem is the delay between use of a voucher and transfer of money to the merchant. In addition pre payment of vouchers from employer point of view lead to increased costs and tying up capital.

SUMMARY

In accordance with aspects of the disclosed embodiments, there is provided a method and system according to the appended claims.

At least some embodiments of the invention provide a method and system for granting access to a service.

This is achieved by a combination of features recited in each independent claim. Accordingly, dependent claims prescribe further detailed implementations of the embodiments of the present invention.

Features and advantages of the disclosed embodiments will become apparent from the following description of aspects of the disclosed embodiments, given by way of example only, which is made with reference to the accompanying drawings.

DETAILED DESCRIPTION OF THE DISCLOSED EMBODIMENTS

As described above, the aspects of the disclosed embodiments are concerned with improving efficiency of performing transactions between consumers and merchants. Embodiments below are related, but not limited, on providing solution on enabling payment of lunch in cafeteria using Short Message Service (SMS) messages with mobile phone. One aspect of the disclosed embodiments would be applicable to subscribers of ecosystem 10 shown in FIG. 1. An exemplifying arrangement of the associate components will now be described.

The Communication network 30 can be any cellular, broadcast, or wide area network. Examples of cellular network technologies include but are not limited to GSM (Global System for Mobile communication), WCDMA (Wideband CDMA), CDMA (Code Division Multiple Access), GPRS (General Packet Radio Service), UTRAN (UMTS Radio Access Network), UMTS (Universal Mobile Telecommunications System), MBMS (Multicast Broadcast Multimedia System), 3 Generation etc. Examples of other network technologies include but are not limited to local area networks, such as Wireless Local area networks (WLAN), BlueTooth (BT), and other technologies, such as WiMax (Worldwide Interoperability for Microwave Access). The communication network 30 may also be connected to a public switched telephone network (not shown) and can provide generic Internet access using any transport methods. The communications network can consists of several technologies forming so called hybrid networks.

The exemplary GSM or 3G Communications network 20 might consists messaging elements Short Message Service Centre (SMSC) 34 or Multimedia Message Service Centre (MMS) 36 for providing Short Message Service (SMS) and Multimedia Message Service (MMS) messaging services for communication network subscribers. Further more the user may access via Communication network 30 data and multimedia resources such as Wireless Application Protocol (WAP) or Web services like web pages, videos etc over private or public data networks such as the Internet 60.

The communication network 30 can be connected to Internet 60 via Gateway (GW) system 32 comprising one or more connectivity means depending on need. Gateway 32 can be for example for providing access to Wireless Application Protocol services in which case Gateway 32 could consist WAP gateway. For generic Internet access to mobile subscribers GW 32 could consists Gateway GPRS Service Node. There might be services operated, managed, monitored or run by Server Systems 20 connected to Internet. Those services might use some Communication Network 30 services. Preferably connection from Server System 20 to Communication Network 30 services is done using secured connection via GW 32. In this scenario GW 32 might consists of firewalls etc to provide controlled access to Communication Network 30 resources.

Figure 1:
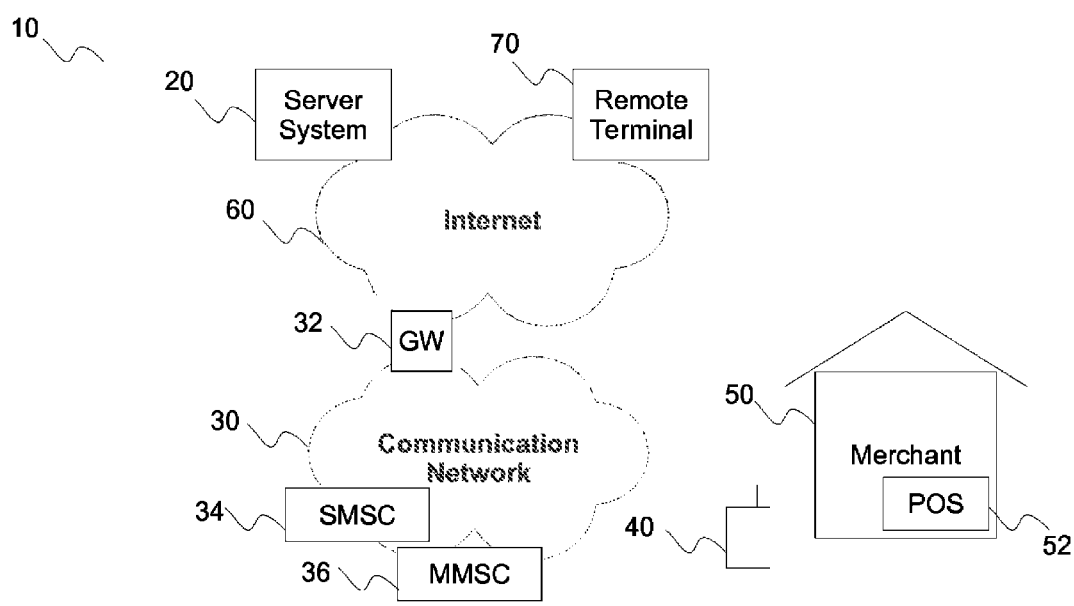
FIG. 1 is a schematic diagram showing an environment in which aspects of the disclosed embodiments can operate.

The mobile terminal 40 may be a mobile phone, a personal digital assistant (PDA), a multimedia computer, a personal computer, a lap top, etc., or generally any terminal capable of accessing services, such as content download, web browsing, streaming, Wireless Application Protocol (WAP) browsing, Internet browsing voice and messaging (SMS, MMS ect). In the case of the mobile network 30 being embodied as a GSM, GPRS or WCDMA network, the terminal is a mobile phone with associated GSM, GPRS or WCDMA functionalities. Mobile terminal might have also other communication interfaces such as BlueTooth, Wireless Local Area Network (WLAN), Radio Frequency Identification (RFID), infrared (IR) etc. While FIG. 1 shows one terminal, in alternate embodiments more terminals can be used.

There can be one or more remote terminals 70 connected to Internet 60. Remote terminals 70 are typically Personal Computers with Internet connection and web browser or dedicated application. Remote terminal can be also mobile terminal with Internet access. In one embodiment, remote terminals might be used for accessing some of services provided by Server System 20 over preferably secured Internet connection.

Some aspects of the disclosed embodiments relate to payment using mobile terminal 40 in Merchants 50 premises to pay for goods or services. Merchant can have or have access to one or more remote terminal 70. Merchant might have also in the premises point of sales terminal (POS) 52. POS 52 is typically cash register or similar. POS might consist also from payment reader such as credit card reader or RFID reader for contactless payments.

In example embodiments Server System 20 is computer system used to receive and send messages to subscribers with mobile terminals 40 via Communication network 30. Server System 20 can be used to monitor usage of services, configure and manage services, and provide reporting services to remote terminals 70. Server system can provide interfaces to accounting systems (not shown) and to bank systems (not shown) for transferring funds between parties. Server System 20 might consist of one or more server units, databases, memories, power units etc. Additionally the modules of server system might be in one location or can be distributed without limiting generality of the disclosure. Server System might run computer program implemented with any programming language such as C++, Java, PHP, ASP etc and might run operating system such as Linux, Windows etc. Databases might be databases like mySQL, Oracle etc.

Figure 2:
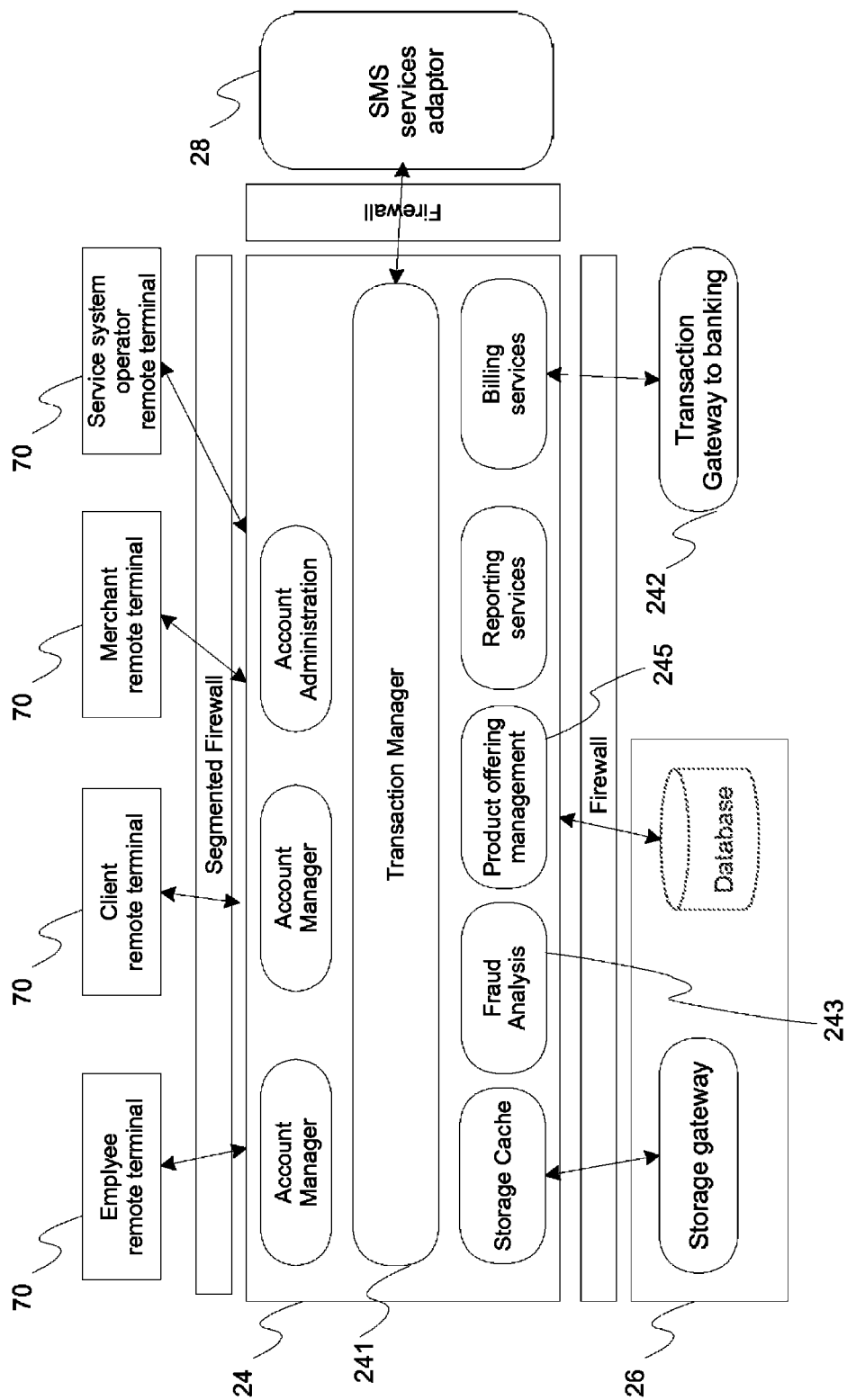
FIG. 2 is a schematic block diagram showing components of a content delivery platform according to an embodiment of the disclosure.

FIG. 2 shows example physical layout of Service System 20 and some related external components. The core of the Service System are servers 24 that include Transaction Manager module 241. Transaction Manager module 241 handles data flows between different components. Transaction manager handles for example messaging services to and from customers using system. For SMS based implementation there is SMS services adaptor server 28 connected via firewall to transaction manager module/component of server(s) 24. SMS service adaptor 28 is further connected to communication network 30 services/elements such as SMSC 32. Users of the system include employees, clients, merchants and system operator of service. These parties can access Service System 20 with remote terminals 70 via firewall and have access depending on configuration to different account management and/or account administrator services running in servers 24. Storage cache is used to enable fast transaction between data bases in server cluster 26 and server cluster 24. Data relating to subscribers, clients, merchants can be stored in databases in servers 26. Since fraud analysis 243 can be time critical function it is preferably implemented as module running in core of Service System 20 ie., in server cluster 24. Additional service modules can be for example Product Offering Management to be used to customise and manage services for Clients and Merchants, Reporting Services for generating reports for users of the system. Typically integration to banking is done via Billing Services module and transaction gateway to banking module 242.

Figure 3:
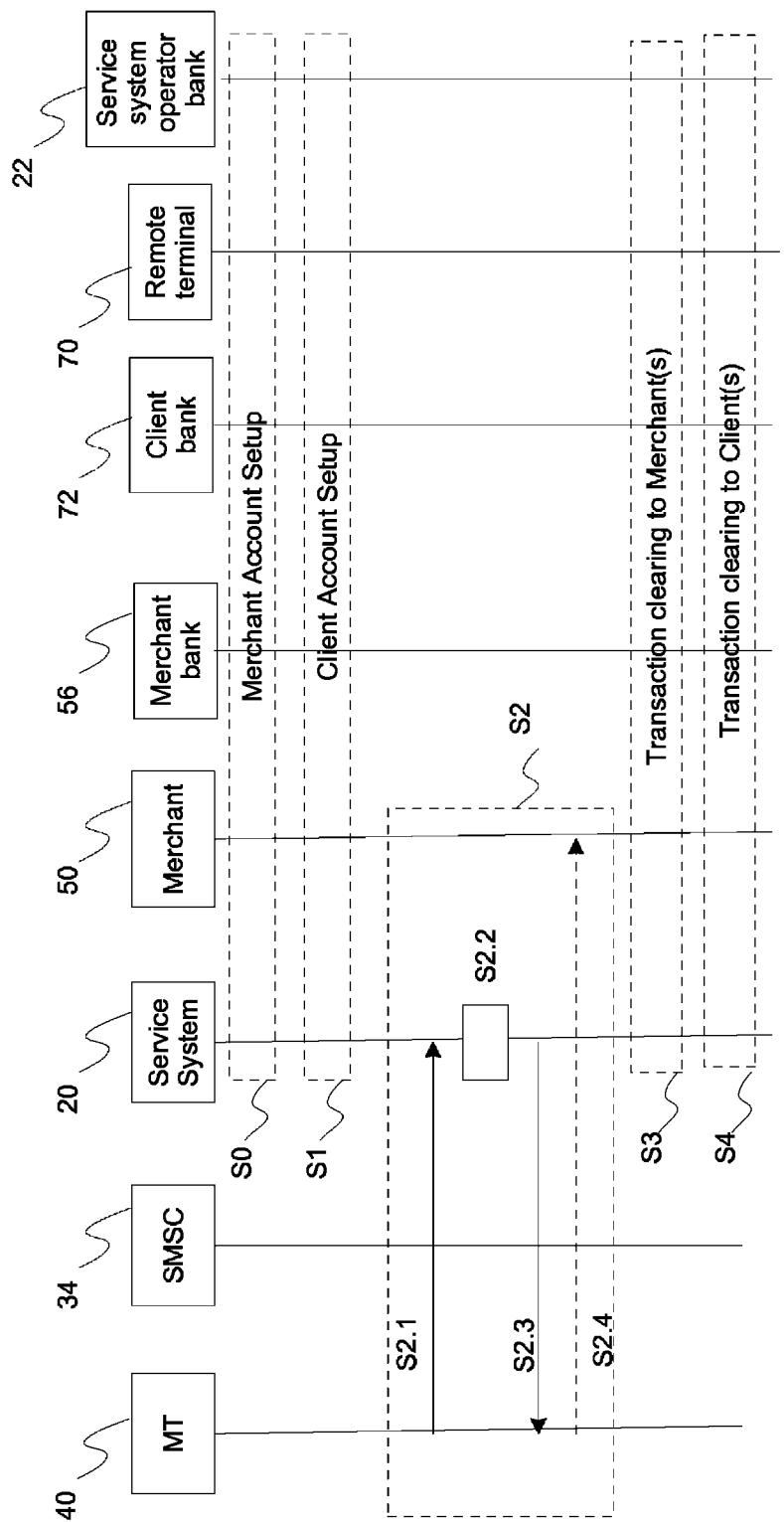
FIG. 3 is a schematic flow diagram showing aspects of the disclosed embodiments.

An example of some steps and functionalities are shown in FIG. 3. In high level there are some main steps S0, S1, S2, S3, S4. The steps might include sub steps like S2.1, S2.2, S2.3, S2.4. Steps might be executed in order of description or any other order. Some of the steps might be executed more than others. In some embodiments all steps are not needed.

Step S0 is called Merchant Account Setup step. As an example, a merchant can be a restaurant like McDonalds™ or Sodexho™. However merchant can be any business offering goods or services. In the step S0 Merchant 50 or representative of Merchant 50 makes agreement with Service System 20 operator (i.e. service provider providing payment service i.e. mobile lunch voucher in this example) or owner or representative. In practice, Merchant 50 agrees to accept payment method of Service System 20 operator as valid payment method in one or more premises of the Merchant. One of sub sets of S0 include setting up business rules on amount of payments accepted by payment method, maximum number of payments in certain period, transaction of funds between service system operator and merchant, configuring Service System 20 to hold profile, account information, merchant bank 56 account information etc. Step S0 might also include integration/configuration of Service System 20 to perform payments automatically or manually to Merchant bank 56 typically from service system operators bank 22 or alternatively from Client bank 72. In one embodiment, Merchant premises are allocated with unique code such as 0001, 1234, 43234, ABC24, AbCD or picture or 2-d bar code, RFID tag etc. Said unique code(s) is(are) stored in the database of Service System 20 of service provider. In one embodiment said unique code is printed in sticker and sticker is sent to merchant. Merchant might place the sticker for example by the front door of the merchant premises or by the point of sales 52 of merchant store 50. The sticker might have information like. "Send code 1234 to number 16400 to pay for lunch" or "Send code 1234 and price of lunch to number 16400 to pay for lunch" or "Send code 1234 and name of lunch to number 16400 to pay for the lunch" etc. In case of 2-d bar codes bar code would be read with bar code reader of mobile phone.

Step S1 is called Client Account Setup step. Client refers to customers of Service system operator. Example clients are companies offering their employees (subscribers for payment service) possibility to pay for lunch or dinner with their mobile phone. In the step S1 Client and service system operator make an agreement about the services. In the agreement they typically agree on payment terms and conditions, a (mobile phone) number range for using services, amount of daily/weekly/monthly purchases with the phone, monetary value(s) per transaction, maximum daily, weekly, monthly transaction monetary value per Client and per employee of Client (subscriber to service), time of the day services are available, range of Merchants (all, some, certain chain, certain area, inclusion, exclusion to/from service etc) the service is available etc. Agreed business rules are stored in database of Service System 20. There can be user interface for Client to monitor, create reports, and/or configure some of the settings via preferably secured connection using remote terminal 70. Clients might have possibility to add and delete subscribers/subscriber numbers (and related employee info like name, employee id etc) using the remote terminal 70.

In some aspects of the disclosed embodiments, subscribers might have different usage profiles for the services. Subscriber might have right to use certain services in limited manner such as one lunch per day or use service only during work days. Usage profile might also include information about maximum daily/weekly amount of funds that can be spent. Additionally usage profiles can have limitations or definitions on which restaurants or other places said subscriber or group of subscribers can use services. As an example there could be usage profile defining that the services can be used for movie tickets or gym. Some of the usage profiles might have setting of following certain tax laws or principles. An example is that one meal per day could be included as tax free benefit but if subscribers uses more than one per day other meals would be accounted as non tax free benefit or as extra salary of subscriber.

In one arrangement Client transfers/allocates certain amount of funds from Client bank 72 to service operator bank 22. As the employees of the Client use the service said funds are offset by amount of money used+possible additional service fees/transaction fees. Offsetting funds is described more detailed in step S4 Transaction clearing to clients.

There are plurality of ways how a user may be registered to a system as a subscriber, i.e. as person who is authorized to use the service and make payments using the system. An embodiment according to at least one of the aspects of the disclosed embodiments is presented in FIG. 4. A client, e.g. Company A, has a unique identification code. The identification code may be issued by the service provider or some existing identification code of the Company A may be used as the unique identification code of the embodiment. Such an existing identification code may be e.g. company's registering number or even name of the Company. The Company A wishing to give access to the service instructs an Employee A1 to use the unique identification when registering to the system using an user interface provided by the service provider. During registration, a subscriber wishing to register to the service enters an unique identification code as instructed by his/her employer. Additionally, the subscriber enters to the system his/her mobile phone number. In some aspects of the disclosed embodiments, the subscriber may add more than one mobile phone numbers. In some embodiments identification information of the subscriber is received from the subscriber. The identification information may comprise one or more of name, address, employee identification number, social security number, and birth date. Also other additional personal details may be also asked from the person registering to the system. After the subscriber has given requested information, a confirmation request including identification information about the subscriber is sent from the service provider to the client. The confirmation request may be delivered from the service provider to the client e.g. by email, SMS, mail or as a message within the client's or the service provider's database system. The client verifies that the client indeed wishes to give rights for the subscriber to register to the system and after that sends a response to the confirmation request. The response may be delivered using same or different method that what was used to deliver the request. After receiving the confirmation response from the client, a confirmation message is sent to the mobile phone number of the subscriber to check that the mobile phone number works. The confirmation message may be sent as a SMS or MMS message. Once a confirmation reply message, e.g. a SMS or MMS message, is received, access to the service is granted for the subscriber and the grant is registered to a database.

According to one aspect of the disclosed embodiments identification information of a subscriber is received from the client. After receiving the identification information of the subscriber, the service system sends an activation link over Internet, e.g. as an e-mail message, to the subscriber. Once the subscriber opens the email and clicks the link and confirms his/her identification information, including his/her mobile phone number.

Figure 6:
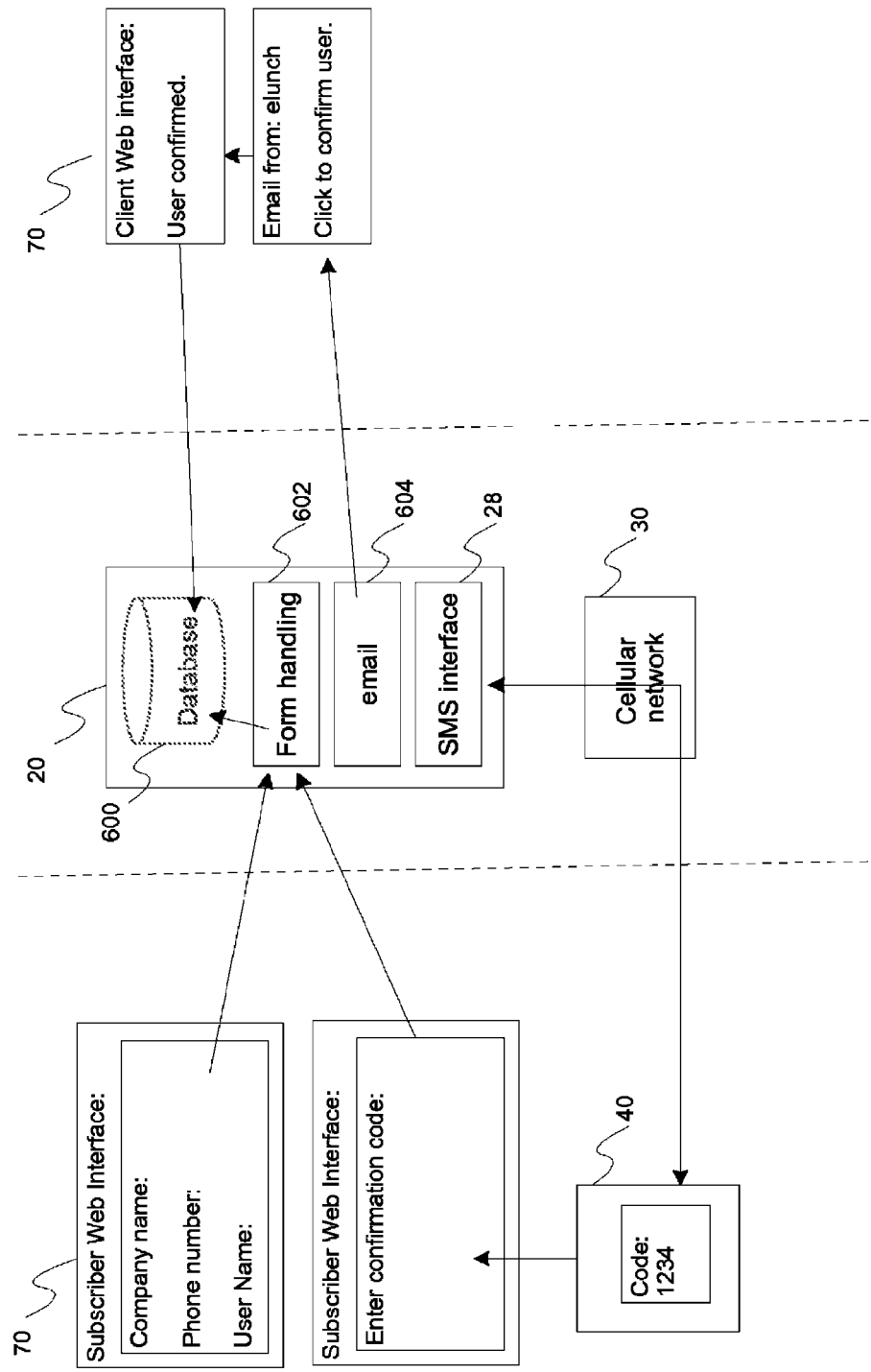
FIG. 6 shows a schematic flow diagram of an aspect of the disclosed embodiments.

Aspects of the disclosed embodiments are typically implemented using a system that comprises elements as shown in FIG. 6. Client/company/employer of employee provides instructions on how to register to the system. This can be done for example by sending an email with instructions and preferably a link to registration page. User i.e. subscriber uses PC 70 connect to server system 20 according to instructions. Typically this is implemented with web based form. The form might include fields such as company name (i.e. client name) where subscriber is working, name of subscriber (user name) and phone number of subscriber. Form is submitted to server system 20 form handling logic 602 and information in the fields is stored in database 600. Server system 20 processes information and using information associated with client name sends for example an e-mail to client. Typically e-mail is sent to human resources department of the company. Instead of e-mail there might be other message such as SMS or normal mail sent to client. Client might also access server system 20 via web interface and look for new submitted subscribers. Client might have database of holding names, passwords, phone numbers, and/or registration indentifications (ID's) of employees. These type of information could be used to make approval process automatic. If client approves subscriber it typically clicks in approve link in either email or in web page. As the approval is done the status of subscriber is changed to approved subscriber in database 600. Server system sends confirmation message via SMS interface 28 to subscriber mobile phone 40 via communication network 30. An example of message is to sent a code consisting of numbers and/or characters to phone and request subscriber to enter the same via web interface. After both steps i.e. client approving subscriber and subscriber phone number has been confirmed the database status of subscriber is changed to "granted to service" status. Subscriber can now use services.

Step S2 is called Usage step. In the step S2 subscribers (employees of Clients or in general consumers) of service with mobile terminal 40 use the terminal to pay for example lunch in a cafeteria. Example use case is a subscriber with mobile phone going to eat lunch at McDonalds™. It is assumed in this example that said restaurant is client of mobile payment service. There is unique code placed in the front door of the restaurant stating: "To pay for any meal please send code 2321 to 16400". Note: since example McDonalds has multiple restaurants in a chain owned either by the chain or franchisee each restaurant might have unique code. Subscriber sends the code "2321" to 16400 using mobile phone 40 via SMSC 34 and communication network 30 to Service System 20 in step S2.1. If subscriber wants to pay for more than one meal the message might include number of lunches to be paid like "2321-2" for two lunches. The Service System 20 receives the message and compares sending number with list of subscriber phone numbers in the database of Service system in step S2.2. Further in step S2.2 Service system checks allocated funds and business rules related to Client of which employee subscriber is. Further is step S2.2 Service System compares business rules of Merchant with code 2321 i.e. allocates for example 6.5€ for the price of lunch meal in said McDonalds™. If subscriber is OK the Service System 20 sends via communication network 30 SMS to subscriber in step S2.3. A message might be for example: "FirstName Lastname, 6.5€, Code=2321-8, 03.05.2009 14:43".

One possible message flow with in Service system 20 for typical received message is to route message from SMS Service Adaptor 28 via firewall to transaction manager 241. Transaction manager 241 sends message to fraud analysis component 243. If message is deemed to be valid according to rules in fraud analysis component 243 it is further sent to product offering management module 245. Message content and subscriber identification code (ID) is used to analyse set business rules related to received voucher. As an example merchant code is mapped to subscribers employee rules on looking what services are allowed. Code might include in addition to merchant code additional information about requested service. If for example merchant is sports club with restaurant there can be merchant code with code 1234a for using to voucher for sports services and code 1234b for restaurant services. Client i.e. employee of subscriber might set rules on which type of services are allowed for each subscriber. As the code and other message content is analysed response message for subscriber is sent via transaction manager 241 to SMS services adaptor 28 and further to subscriber as a message. Typically product offering management module 245 also updates related databases to record transaction and create report of the transaction. Since there can be large number of different combinations of subscriber rights, client settings, regulatory constrains, mandatory transaction records and merchant preferences and offerings and prices the product offering management module 245 can run configurable algorithm or several algorithms to analyse message content to determine which services are granted.

The code might have fixed part and variable part. Code fixed part could be for example allocated number of merchant. Additionally fixed part could be daily code that varies. Variable part could be for example running number form 1, 2, 3, . . . etc. Running number could be used by restaurant clerk to verify that there is no fraud since those would be allocated by Service System in order. As an example first customer of the day would have Code 2321-1, second 2321-2, third 2321-3 etc. In case of having next customer with code 2321-2 would indicate for restaurant possible fraud since number 2321-2 had already be used. Alternatively code could be pseudo random code issued by Service System. List of same codes would have been delivered to restaurant and clerk would strike over one of the codes each time those are used.

Message might show as sender a number like 16400 or any text like eLunch or McLunch etc. Subscriber shows the message in restaurant to clerk to pay for the meal. Clerk might verify from list to see that said daily code is valid and for example ask person to identify him selves. Clerk will complete the purchase with POS 52. Alternatively Message to subscriber might be Multimedia Message Service (MMS) message containing for example certain picture as code for the Merchant and/or for example photo of the subscriber to be used for identification.

Figures 4, 5:
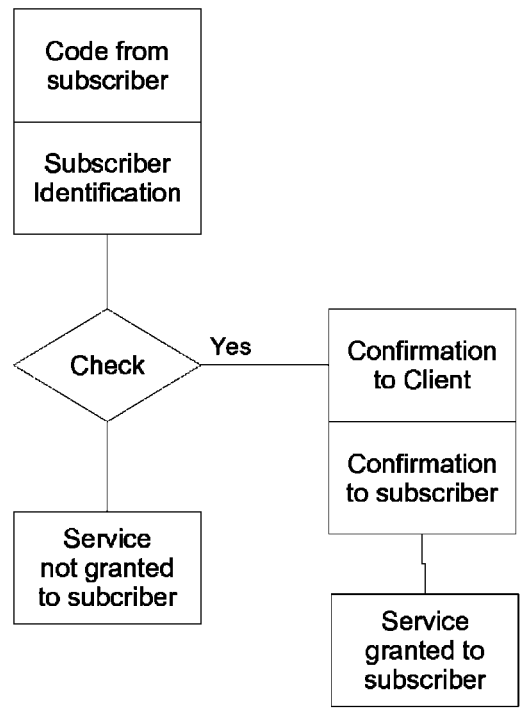
FIG. 4 is a schematic flow diagram showing a message flow incorporating aspects of the disclosed embodiments.
FIG. 5 shows a schematic database structure incorporating aspects of the disclosed embodiments.

An example of some elements in database related to usage of services shown in FIG. 5. There is information related to subscriber 502 in database. For example subscribers might have identification code and associated other information such as mobile phone number etc. In data base there can be elements like Merchant identification (ID) 508. Example ID's could be 123, 321, 233 further being associated with actual Merchants such as restaurants. Each subscriber might have one or more Wallets 506 associated with subscriber.

Using wallet structure in database enables to reduce risk of fraud or credit losses. In practice wallets could be arranged in first in first out structure with principle of filling certain amount of credits (by clients to subscriber wallets) to be used per time period per wallet. As the credits are used from the wallet those would be filled based on business rules. This way possible loss of mobile terminal would lead to using only limited amount of credits.

As an example subscriber might have wallets A, B and C for different usage and business rules. Wallets might be for example for certain days (weekdays and weekends) or type of Merchants (restaurant vs health spa vs movie theatre). There might be business rules associated with subscriber service allowing certain services via certain wallets. For example Wallet A could have daily limit to Merchant 321 services. Merchants might set rules like maximum one purchase per day per subscriber, maximum monetary value per subscriver or certain number of vouchers per client per time period.

Business rules can be individual, group based or same for all. As an example of group based certain clients would set same rules for all employees. One such rule could be to adjust maximum allowed lunch value depending on location of subscriber. With this arrangement clients could take in account price level variations on services on area to area. Clients could also set system to work in such a way that for example lunch voucher is only valid when subscriber is travelling outside of own home city or town. This is particularly useful in situations where for example based on taxation laws employees are allowed to have free tax-free meals only when travelling. In such location based implantations service system 20 receives for location information either from mobile terminal (Global Position System GPS location or cell identification etc) or from mobile communication network 30. Location rules related rules would be implemented preferably in product offering management module 245 of service system.

Other type of group based rules could be legislative type of rules. An example of such is certain taxation laws applicable on giving free lunch to employees. In this type of group based rules could be adjusted based on place of work or citizenship of subscribers.

Subscriber might be allowed to use or have been given permission to use services from one or more Clients as the case might be for example if subscriber is working in two different companies. Wallets could be associated further with certain Client/Clients. Typically subscriber can access status of the Wallets via web interface using remote terminal 70 or for example by requesting status with mobile phone message.

Step S3 is called transaction cleared to merchant step. The transaction that is basically recorded, as approved transaction in step S2.2 is further processed in order to transfer related funds to merchant bank 56 either from service system providers bank 22 or from clients bank 72 depending on agreements and system integration. Funds transfer might happen in real time or close real time after each transaction, daily or for example once week or month or alternatively as soon as predefined amount of payments or number of payments have been collected. Merchants have possibility to monitor amount of sales via mobile payment system and generate reports like daily sales, sales by time of day, weekly sales etc using remote terminal 70.

Step S4 is called transaction cleared to client step. The service system might provide Client with periodic or real time or close to real time reports of usage of payments by employees of client. Service system might send automatic reminders to Clients to "top up" their monthly funds and receive funds from client bank 72. Client has possibility to generate reports of usage of mobile payment system by its employees (subscribers of system).

In further embodiment the Service System 20 sends notification message to mobile terminal of Merchant to verify payment or compare code shown by customer. Additionally clerk can send verification request such as code shown by customer to Service System to verify the code in order to prevent fraud. In further embodiment the clerk can use remote terminal 70 to access Service System 20 to check validity of said customer code or terminal number or eLunch voucher. Additional embodiment is to have a list of unique codes or ordered list of codes by POS for clerk to check that code shown by customer is valid. Check list can comprise list of random codes, or list of codes generated by some algorithm or list of codes for example in order 1, 2, 3, 4, etc. List would correspond to one in Service System 20 variable code part list.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for providing a mobile payment service, the method comprising:
    storing, in a service system of a service provider of the mobile payment service, merchant accounts for merchants registered to the service, wherein a merchant account comprises a unique code allocated to premises of the merchant;
    storing, in the service system, client accounts for clients registered to the service, wherein a client is a client of the service provider and a client account comprises subscribers and subscriber numbers associated with the client and rules concerning use of the service by the subscribers associated with the client;
    storing, in the service system, subscriber accounts for subscribers registered to the service, wherein a subscriber is a user of the mobile payment service;
    receiving funds allocated by a client for being used in said mobile payment service by subscribers associated with said client;
    receiving from a mobile terminal of a subscriber a message that comprises the unique code allocated to premises of the merchant,
    checking, in the service system, on the basis of the received message, funds allocated by the client associated with the subscriber and rules related to the client associated with the subscriber, to determine which service is granted, and
    sending a response message to the mobile terminal of said subscriber, which response message can be used for paying for a service and/or a product offered by said merchant to the subscriber at the premises, and wherein said response message comprises a code that comprises a fixed part and a variable part, wherein said variable part is usable for verifying the response message for avoiding fraud.

2. The method according to claim 1, wherein a subscriber identification code is used for analyzing the rules in said checking of the received message.

3. The method according to claim 1, wherein in said checking of the received message, a sending number of the received message is compared to subscriber phone numbers in a database of the service system.

4. The method according to claim 1, wherein said rules concerning use of the service by the subscribers associated with the client are individual or group based.

5. The method according to claim 1, wherein said rules concerning use of the service by the subscribers associated with the client are location based.

6. The method according to claim 1, wherein said received message comprises solely the unique code allocated to premises of the merchant.

7. The method according to claim 1, wherein said received message comprises further information in addition to the unique code allocated to premises of the merchant.

8. The method according to claim 1, wherein the unique code allocated to premises of the merchant comprises additional information about the requested service.

9. The method according to claim 1, wherein a merchant account comprises an own unique code for each premises of the merchant.

10. The method according to claim 1, wherein said fixed part is the unique code allocated to premises of the merchant included in the received message or a varying daily code.

11. The method according to claim 1, wherein said variable part is a running number.

12. The method according to claim 1, wherein the method further comprises transferring from funds allocated by said client to said merchant an amount of funds that corresponds to the granted service.

13. The method according to claim 1, wherein the premises of the merchant comprises multiple premises, each at a different location.

14. The method according to claim 1, wherein the unique code corresponding to a specific premises of the merchant is obtained by scanning a code identifier at the specific premises of the merchant.

15. The method according to claim 1, wherein the response message is presented to the merchant at the premises to pay for the service or product.

16. The method according to claim 1, wherein the client account is an employer and the subscriber account is an employee.

17. A service system configured to provide a mobile payment service, wherein the system comprises at least:
    a database configured to store merchant accounts for merchants registered to the mobile payment service, wherein a merchant account comprises a unique code allocated to premises of the merchant,
    a database configured to store client accounts for clients registered to the service, wherein a client is a client of the service provider and a client account comprises subscribers/subscriber numbers associated with the client and rules concerning use of the service by the subscribers associated with the client,
    a database configured to store subscriber accounts for subscribers registered to the service, wherein a subscriber is a user of the mobile payment service,
    an interface configured to receive funds allocated by a client for being used in said mobile payment service by subscribers associated with said client,
    a messaging module configured to receive from a mobile terminal of a subscriber a message that comprises the unique code allocated to premises of a merchant,
    a management module configured to check, in the service system, on the basis of the received message, funds allocated by the client associated with the subscriber and rules related to the client associated with the subscriber, to determine which service is granted, and
    a messaging module configured to send a response message to the mobile terminal of said subscriber, which response message can be used for paying a service and/or a product offered by said merchant and said response message comprises a code that comprises a fixed part and a variable part, wherein said variable part is usable for verifying the response message for avoiding fraud.

* * * * *